United States Patent [19]

Skonieczny et al.

[11] Patent Number: 5,238,203

[45] Date of Patent: Aug. 24, 1993

[54] HIGH SPEED TURN COORDINATION FOR ROTARY WING AIRCRAFT

[75] Inventors: Joseph P. Skonieczny, Madison; Donald L. Fogler, Jr., Milford; Phillip J. Gold, Shelton, all of Conn.; James F. Keller, Media; James B. Dryfoos, Wallingford, both of Pa.

[73] Assignee: United Technologies Corporation, Hartford, Conn.

[21] Appl. No.: 751,431

[22] Filed: Aug. 28, 1991

[51] Int. Cl.$^5$ ............................................. G06F 15/50
[52] U.S. Cl. .................................. 244/17.13; 364/434
[58] Field of Search ............... 244/17.13, 17.21, 175, 244/177, 179, 181, 184; 364/432-435

[56] References Cited

U.S. PATENT DOCUMENTS

| | | | |
|---|---|---|---|
| 3,057,584 | 10/1962 | Bretoi | 244/193 |
| 3,688,099 | 8/1972 | Buscher | 244/195 |
| 4,003,532 | 1/1977 | Adams et al. | 244/17.13 |
| 4,067,517 | 1/1978 | Barnum | 244/17.13 |
| 4,106,094 | 8/1978 | Land | 364/434 |
| 4,206,891 | 6/1980 | Perez et al. | 244/17.13 |
| 4,312,039 | 1/1982 | Skutecki | 244/17.13 |
| 4,313,201 | 1/1982 | Fischer et al. | 364/434 |
| 4,371,939 | 2/1983 | Adams et al. | 364/434 |
| 4,382,283 | 5/1983 | Clelford et al. | 364/434 |
| 4,477,876 | 10/1984 | Wright et al. | 364/434 |
| 4,484,283 | 11/1984 | Verzella et al. | 364/434 |
| 4,626,998 | 12/1986 | Adams et al. | 244/179 |

Primary Examiner—Joseph F. Peters, Jr.
Assistant Examiner—Virna Lissi Mojica
Attorney, Agent, or Firm—Patrick J. O'Shea

[57] ABSTRACT

A helicopter flight control system (21) includes a model following control system architecture which automatically provides a coordinating yaw command signal to the helicopter tail rotor to coordinate helicopter flight during a banked turn. The control system processes information from a variety of helicopter sensors (31) in order to provide the coordinating yaw command signal on an output line (72) to the tail rotor (20) of the helicopter.

15 Claims, 15 Drawing Sheets

FIG.5 HIGH SPEED TURN COORDINATION

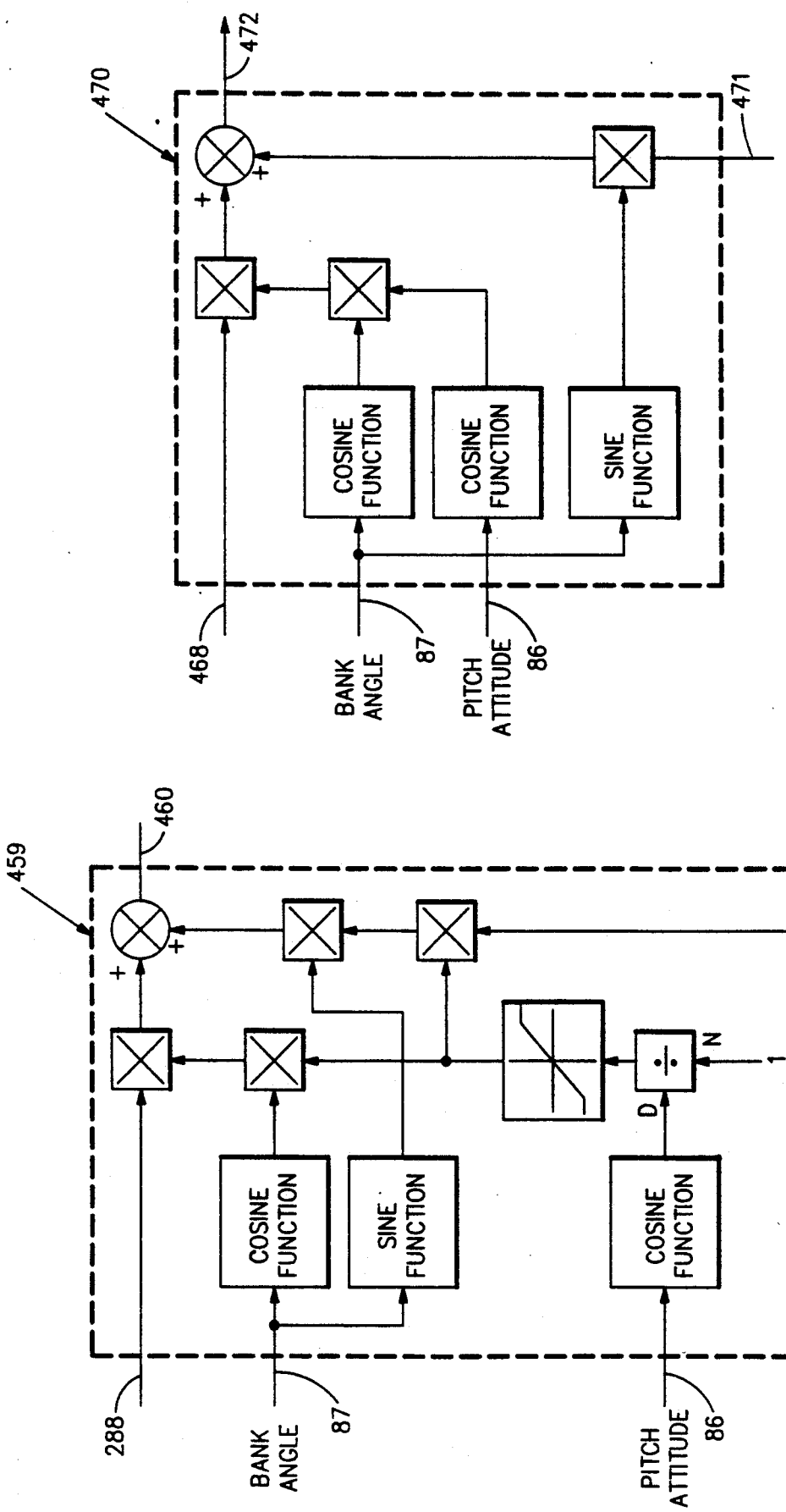

HIGH SPEED TURN COORDINATION FOR ROTARY WING AIRCRAFT

The Government has rights in this invention pursuant to a contract awarded by the Department of the Army.

DESCRIPTION

Technical Field

This invention relates to flight control systems for rotary wing aircraft, and more particularly to such flight control systems which provide automatic turn coordination control.

Background Art

A coordinated turn for a rotary wing aircraft (e.g. a helicopter having a single main rotor) is defined as a banked turn where the body of the aircraft is tangential to a curvilinear flight path and net acceleration is normal to the floor of the aircraft (no side-slip vectors). Control of yaw axis commands to the tail rotor is critical in this type of maneuver.

In mechanical linkage control systems a coordinated turn required that the pilot simultaneously input (via rudder pedals) the proper amount of yaw to match the amount of roll input provided via the cyclic stick. The more recent fly-by-wire flight control systems (see for example U.S. Pat. Nos. 4,003,532, 4,067,517, 4,206,891 and 4,484,283, all assigned to the assignee of the present invention) automatically provide the matching yaw input. The automatic flight control system (AFCS) commands a coordinating yaw input (typically at airspeeds above 60 knots) based on the sensed lateral acceleration. The coordinating yaw signal is then used to modify the main and tail rotor command signals as necessary to drive the helicopter's lateral acceleration to zero. However, all these systems use conventional control system architecture, and hence are not compatible with "model following" fly-by-wire flight control systems.

DISCLOSURE OF THE INVENTION

An object of the present invention is to provide an improved model following flight control system for a rotary wing aircraft, which automatically compensates for actual yaw rate and lateral acceleration during high speed turn coordination of the aircraft.

According to the present invention, an improved model following flight control system anticipates the turn coordination maneuver by monitoring the roll rate gyro, then calculates a desired (modeled) yaw rate value as the product of the sine value of the aircraft bank angle multiplied by the aircraft acceleration due to gravity (g), and divided by airspeed. In further accord with the present invention, the aircraft's sensed lateral acceleration is used to modify the desired yaw rate in order to drive the lateral acceleration error to zero. In still further accord with the present invention, the desired yaw rate command value is variably scaled as a function of airspeed so as to bring in high speed turn coordination gradually between 60 and 80 knots airspeed.

The present invention reduces pilot workload since turn coordination is automatically provided in the flight control system, and improves the aircraft flight path control due to the system's inherent ability to act as a heading hold system. Furthermore the pilot is no longer required to input a yaw command via rudder pedals since the present invention automatically provides the required yaw input for a coordinated turn.

These and other objects, features, and advantages of the present invention will become more apparent in light of the following best mode embodiment thereof as illustrated in the accompanying Drawing.

BRIEF DESCRIPTION OF THE DRAWING

FIG. 14 is a detailed illustration of the Body to Euler Transform of FIG. 4;

FIG. 15 is a detailed illustration of the Euler to Body Transform of FIG. 4;

BEST MODE FOR CARRYING OUT THE INVENTION

Figure 17:
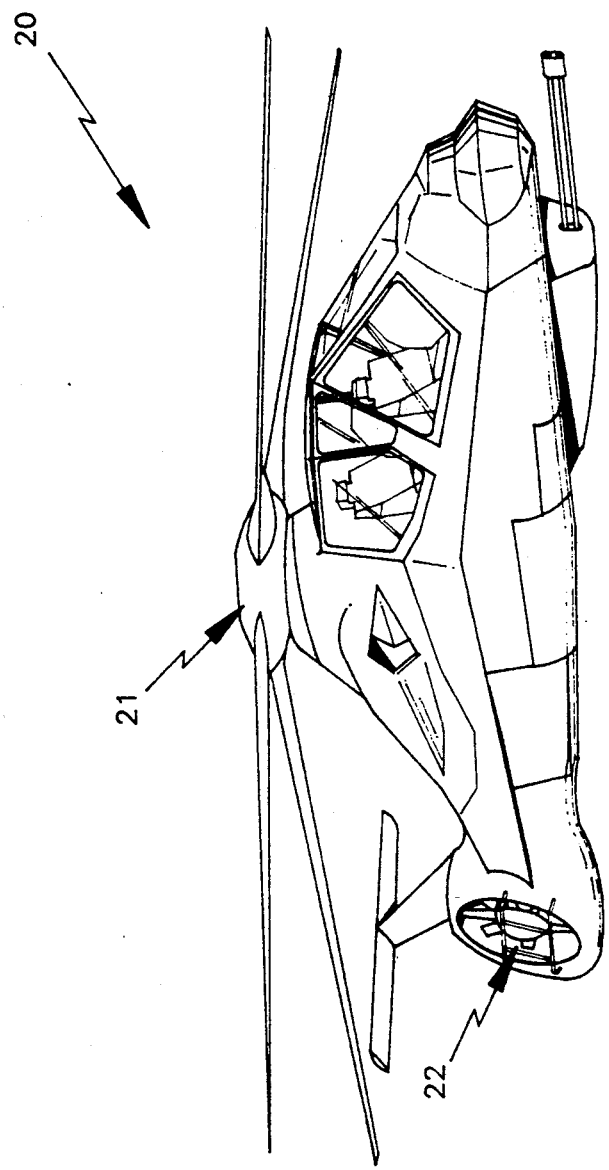
FIG. 17 is a pictorial illustration of an aircraft in which the flight control system embodiment of FIG. 1 may be used.

Referring first to FIG. 17, which is a pictorial illustration of a helicopter embodiment 18 of a rotary wing aircraft in which the present invention may be used. The helicopter includes a main rotor assembly 19 and tail rotor assembly 20.

Figure 1:
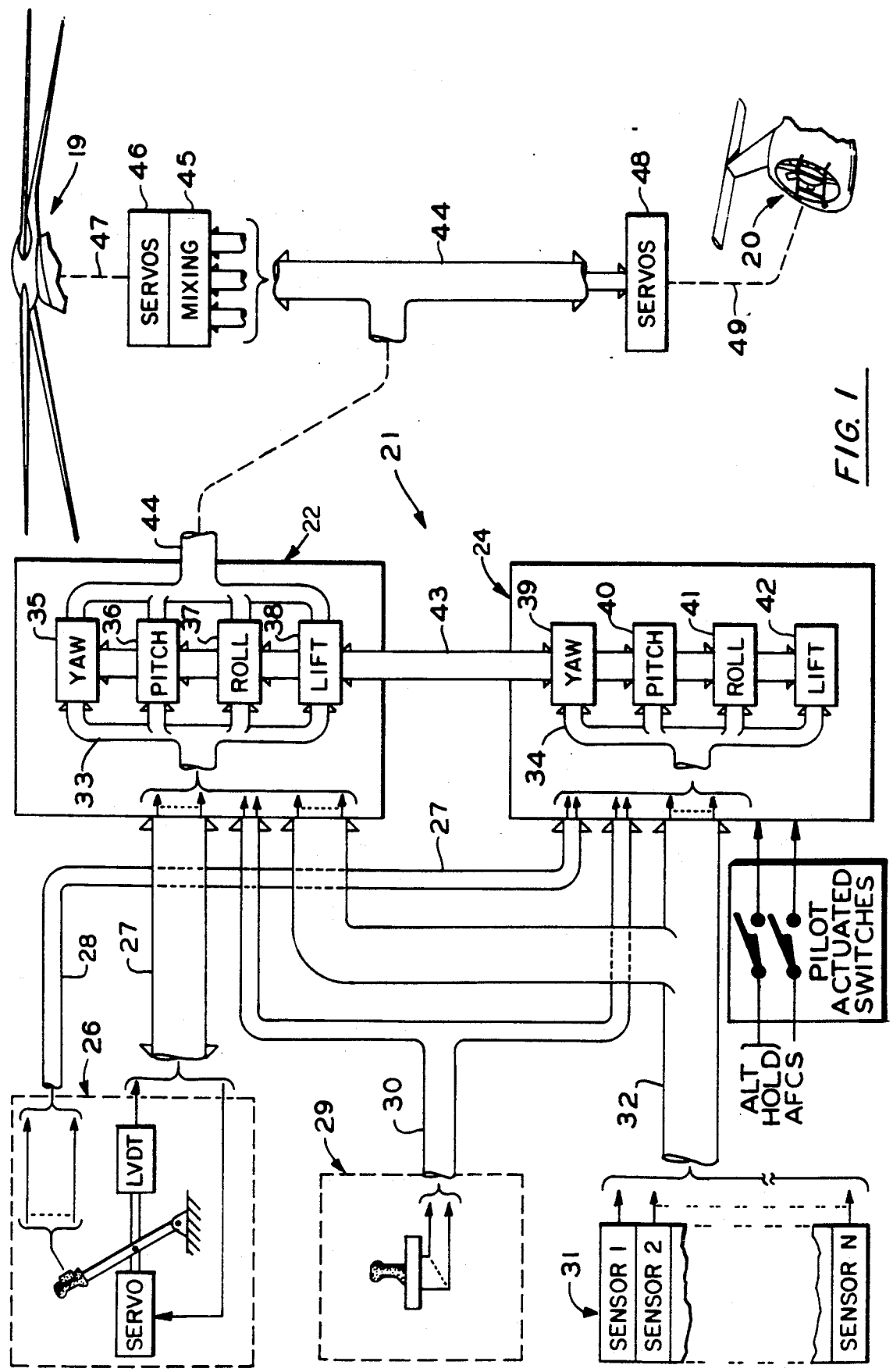
FIG. 1 is a block diagram of the improved model following flight, control system of the present invention.

Referring now to FIG. 1, the helicopter flight control system of the present invention 21 is a model following control system which shapes the pilot's sidearm controller and displacement stick commands through an "inverse vehicle model" to produce the desired aircraft response. The system includes a Primary Flight Control System (PFCS) 22 and an Automatic Flight Control System (AFCS) 24. The PFCS receives displacement command output signals from a displacement collective stick 26 on line 27 and the AFCS receives the collective stick discrete output signals on a line 28. The PFCS and AFCS each receive the force output command signals of a four axis sidearm controller 29, on lines 30, and the aircraft's sensed parameter signals from sensors 31, on lines 32. The pilot command signals on lines 27, 28, and 30 and the sensed parameter signals on lines 32 are shown consolidated within trunk lines 33 and 34 in the PFCS and AFCS, respectively.

The PFCS and AFCS each contain control channel logic for controlling the yaw, pitch, roll and lift axes of the aircraft. In FIG. 1 these logic modules are shown by blocks 35–38 for the PFCS and blocks 39–42 for the AFCS. The PFCS provides rotor command signals and the AFCS logic provides conditioning and/or trimming of the PFCS four axis logic functions. The PFCS and AFCS logic modules interconnect through bus 43.

As described in detail hereinafter, the PFCS and AFCS use a model following algorithm in each control axis to provide rotor command signals on output lines 44 to a main rotor mixing function 45 which commands displacement of mechanical servos 46 and linkages 47 to control the tip path plane of the main rotor 19. Rotor command signals are also provided on lines 44 to the helicopter's tail rotor servos 48 which control the thrust of the tail rotor 20 through linkages 49. The sensed parameter signals from sensors 31, on lines 32, provide the PFCS and AFCS with the aircraft's angular rate and attitude response to the rotor command signals.

Figure 2:
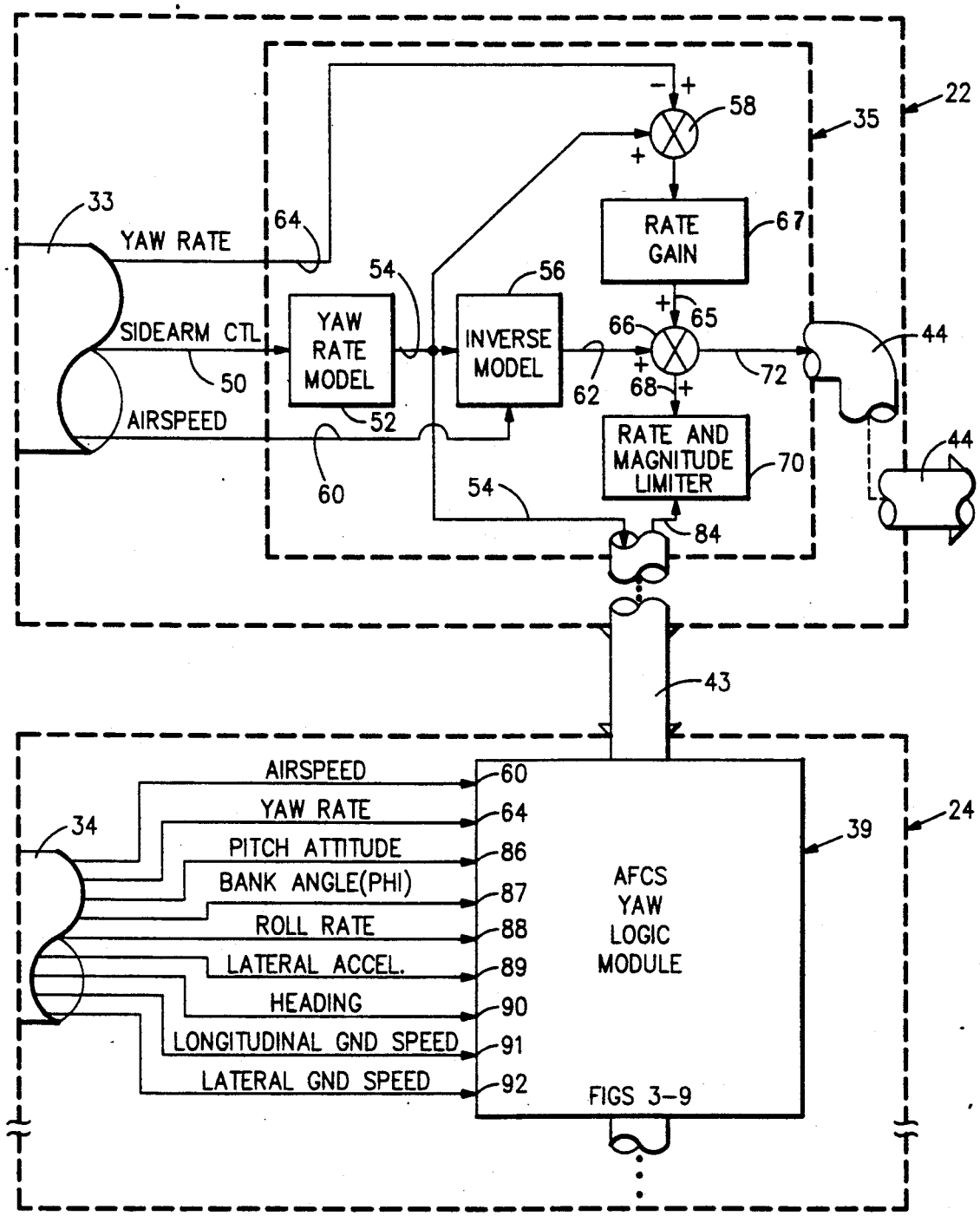
FIG. 2 is a schematic illustration of one portion of the embodiment of FIG. 1.

FIG. 2 is a partial schematic section of FIG. 1, illustrating the functional interconnection of the PFCS 22 and AFCS 24 yaw logic modules 35 and 39, respectfully. The PFCS yaw logic module 35 receives a yaw axis command signal on line 50, provided through trunk lines 33 and lines 30, from the sidearm controller 29 (FIG. 18). In the present embodiment the sidearm controller is a four axis force stick in which the yaw axis command signal is generated by the pilot's lateral twisting (left or right yaw) of the sidearm controller. The yaw command signal is presented to the input of yaw rate model circuitry 52 (e.g. a first order lag filter with selected radians/sec/volt signal gain) that provides a commanded yaw rate signal on a line 54 indicative of the desired rate of change for the aircraft attitude about the yaw axis. Selection of the yaw rate model is dependent on the dynamics of the aircraft and the yaw response desired.

The commanded yaw rate signal on line 54 is presented simultaneously to: the input of a yaw-axis, vehicle inverse model 56, a summing junction 58, and the bus 43 to the AFCS yaw logic module 39. The inverse model 56 receives the aircraft's actual airspeed from sensors 31, through lines 32 and trunk 33, as a sensed airspeed signal on line 60. The inverse model 56 is a Z-model transform, which may be embodied as a first order lead filter with instantaneous voltage gain and time constant characteristics which vary with the magnitude of the sensed airspeed signal on line 60. The cascaded yaw rate model 52 and inverse model 56 provide a feedforward path for the sidearm control signal on line 50.

The feedforward, inverse Z-model transform provides the primary control input to tail rotor 20 (FIG. 1) which causes the helicopter 18 (FIG. 17) to yaw at a rate set by the commanded yaw rate signal on line 62. This desired yaw rate signal represents the tail rotor command necessary to achieve the desired yaw-axis rate of change of the aircraft for each pilot commanded maneuver.

The summing function 58 sums the commanded yaw rate signal on line 54 (from the yaw rate model 52) with the aircraft's actual yaw rate, received (from sensors 31, through lines 32 and trunk 33) as a sensed yaw rate signal on line 64, to provide a yaw rate error signal. The rate error signal is amplified in a rate gain stage 67 and presented on a line 65 to one input of a second summing junction 66. The junction 66 also receives the desired yaw rate signal on line 62 from the inverse model 56, and a yaw command modifying signal on a line 68 from a rate and magnitude limiter 70. The limiter 70, which receives a nonlimited version of the yaw command modifying signal on a line 84 (through bus 43) from the AFCS yaw logic module 39, limits the yaw command modifying signal if magnitude and rate of change limits are exceeded. The resulting sum signal is provided on the output line 72 of the PFCS yaw logic module 35, and presented through the PFCS output trunk lines 44 to the tail rotor servos (48, FIG. 1).

The magnitude and rate of change of the yaw command modifying signal from the AFCS is a function of the aircraft heading error. The aircraft heading error is the second of two feedback loops around the tail rotor command signal; the first being the yaw error signal on line 65. As described in detail hereinafter, the yaw command modifying signal is a calculated value provided by a model following algorithm within the AFCS, based on the actual aircraft response to the tail rotor command signal. The yaw command modifying signal modifies the signal magnitude and rate of change of the tail rotor command signal by cancelling that component of the actual yaw rate magnitude (of the sensed yaw rate signal on line 64) which occurs during execution of a coordinated turn. The model following algorithm of the AFCS processes sensed aircraft parameters (sensors 31, FIG. 1) to generate command rate modifying signal characteristics which provide turn coordination at speeds greater than 60 knots when the pilot applies roll stick inputs. The present invention lies in the shaping and conditioning of the yaw command modifying signal in response to the sensed aircraft parameters.

As shown in FIG. 2, in addition to the commanded yaw rate signal received from the PFCS yaw logic module 35 on line 54 (through trunk 43), the AFCS yaw logic module 39 receives the following sensed aircraft parameters through trunk line 34: actual airspeed (line 60), actual yaw rate (line 64), pitch attitude (line 86), bank angle (PHI) (line 87), roll rate (line 88), lateral acceleration (line 89), heading (line 90), longitudinal ground speed (line 91), and lateral ground speed (line 92). The best mode embodiment of the AFCS is as a microprocessor based electronic control system in which the algorithms of the AFCS logic modules (39–41, FIG. 1) reside in executable program listings stored in memory.

Figure 3:
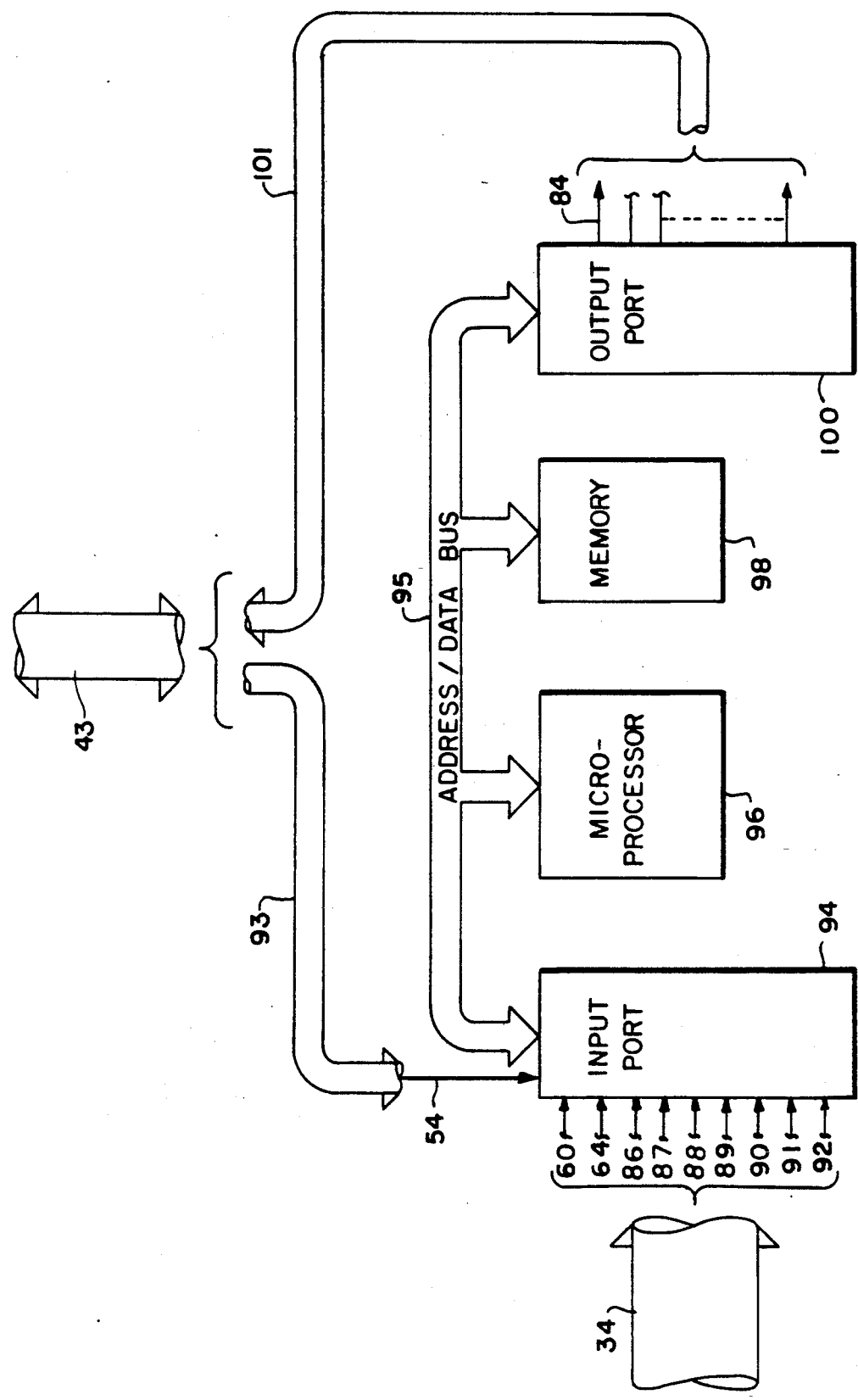
FIG. 3 is a block diagram of one embodiment of system components illustrated in FIG. 2.

FIG. 3, shows the architecture of a microprocessor based AFCS 24. The commanded yaw rate signal on line 54 is received from input lines 93 included within the lines 43 interconnecting the AFCS and PFCS. The sensed aircraft parameter signals on lines 60, 64, and 86–92 are received from the AFCS input trunk line 34, at an AFCS input port 94. Depending on the format of the input signals (analog or digital) the input port 94 which may include an analog-to-digital converter, a frequency-to-digital convertor, and such other signal conditioning functions known to those skilled in the art as being required to transform the input signals to digital signal format.

The input port is connected through an address/data bus 95 to a microprocessor 96 (e.g., Intel 80286, Motorola 68020), memory means 98 (including RAM, UV-PROM, EEPROM), and an output port 100. The output port may comprise a digital-to-analog converter, a parallel-to-serial convertor, a discrete output driver, and such other signal conversion functions known to those skilled in the art as being required to transform the AFCS digital signal format to that required by the control system (21, FIG. 1). The output port lines, including the line 84 to the PFCS yaw logic module 35, are presented through lines 101 to the interconnecting lines 43.

Figure 4:
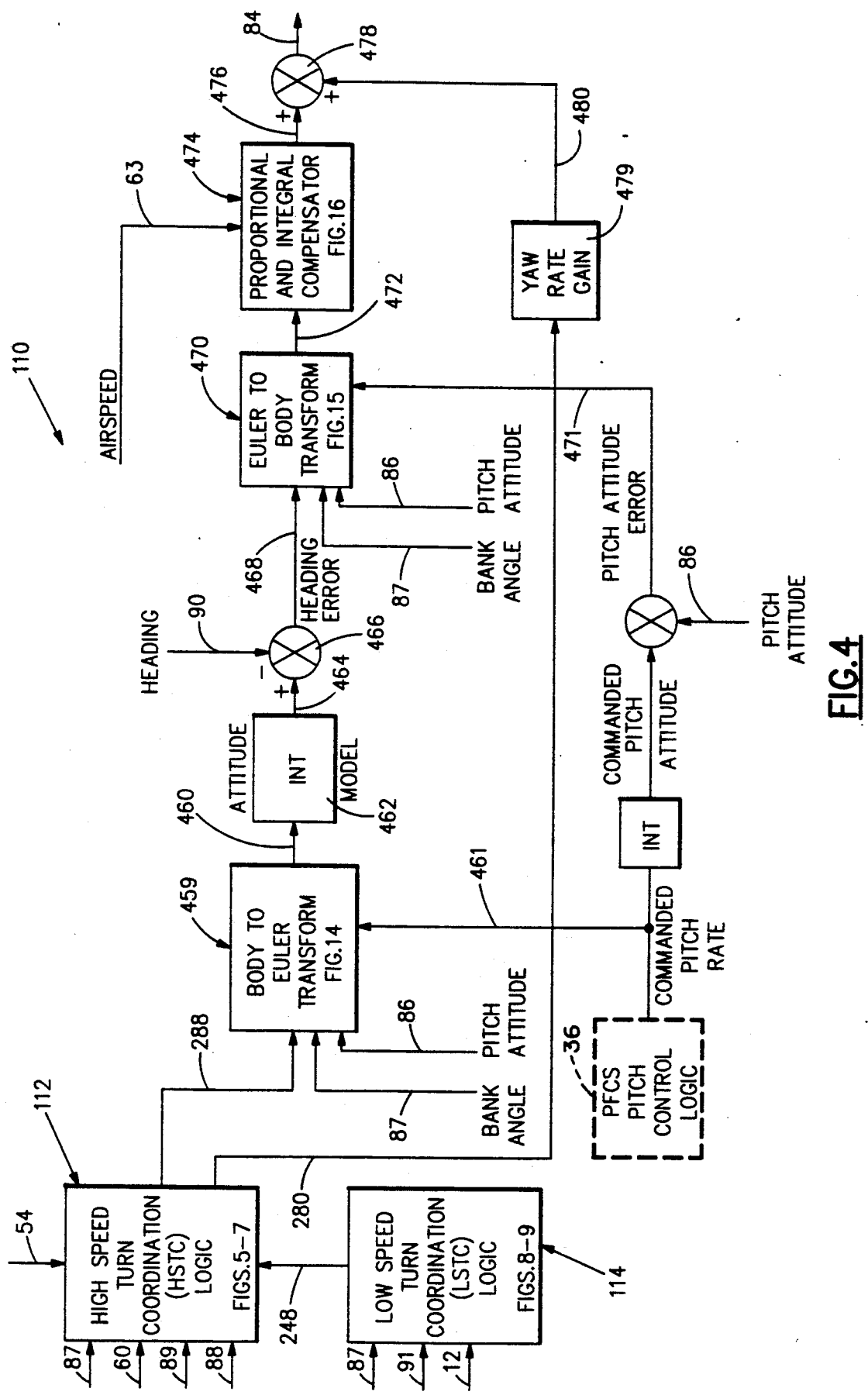
FIG. 4 is a schematic illustration of the functional elements of the component illustrated in FIG. 3.

FIG. 4 is a block diagram of the AFCS yaw logic 110 resident in the memory 98, and executable in the microprocessor 96. The logic comprises both High Speed Turn Coordination (HSTC) logic 112 and Low Speed Turn Coordination (LSTC) logic 114. The HSTC and the LSTC logics will be discussed separately, along with a turn coordination trim system to be discussed hereinafter. Note, the HSTC logic includes the logic for conditioning pilot commanded yaw inputs via the sidearm controller at speeds above 60 knots.

HIGH SPEED TURN COORDINATION

Figure 5:
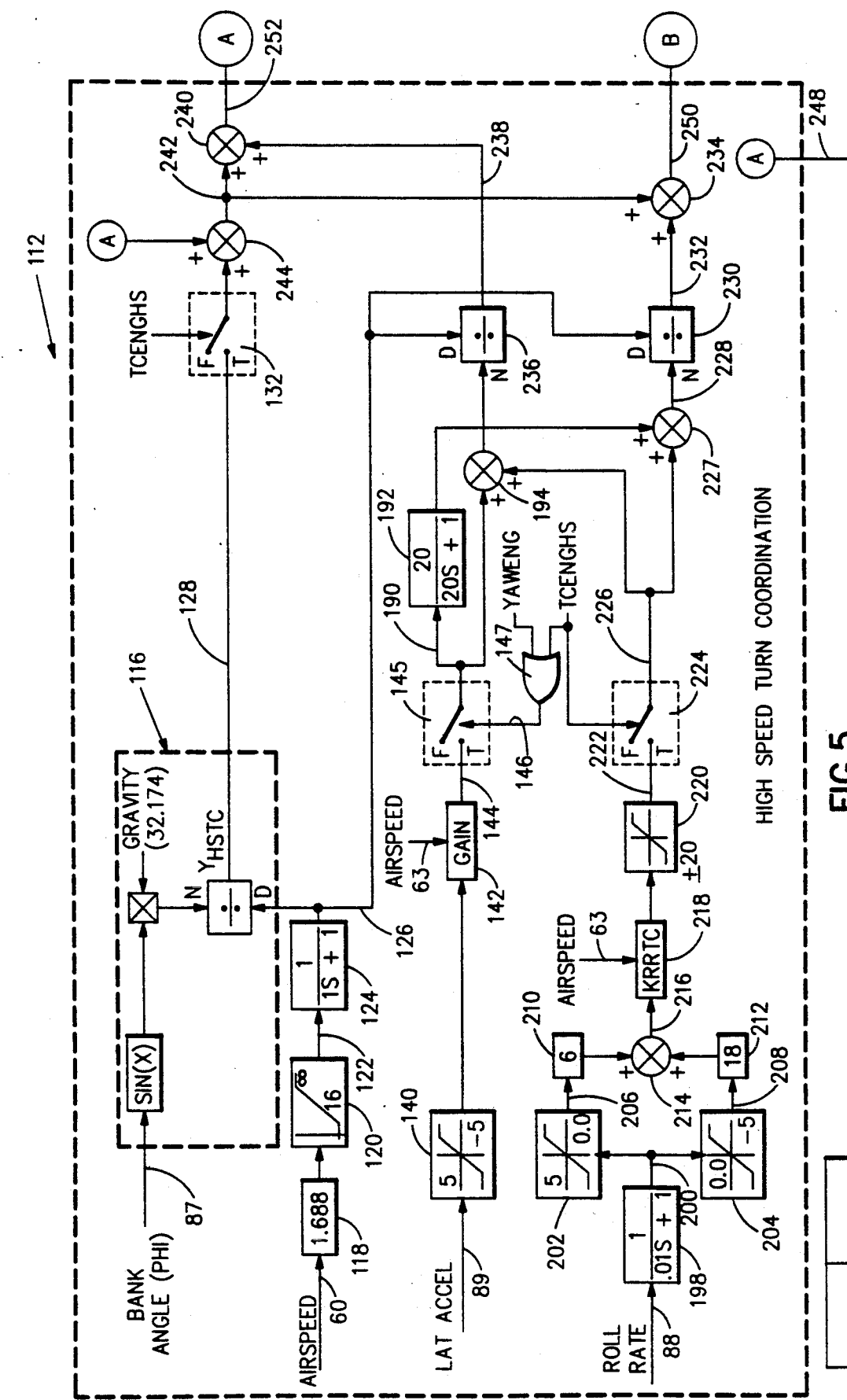
FIG. 5 is a schematic illustration depicting further functional details of FIG. 4.

As shown in FIG. 5, the HSTC logic 112 receives the bank angle signal, the airspeed signal, the lateral acceleration signal, and the roll rate signal. The bank angle signal on the line 87 is input to logic 116 which implements the equation:

$$r_{hstc} = (g * \sin(PHI))/(\text{conditioned airspeed}) \quad \text{(Eq. 1)}$$

where
$r_{hstc}$ = yaw rate necessary for a coordinated turn
g = 32.174 feet/sec$^2$
PHI = the bank angle signal on the line 87.

The airspeed signal in knots on line 60 is input to a gain 118 which converts the signal to feet/second and which provides a signal to a limiting function 120 to prevent a limited output signal on a line 122 from dropping below a certain value (e.g., 16 ft/sec) to prevent dividing by zero. The limited output signal is input to a lag filter 124 which provides the conditioned airspeed signal on a line 126 to the logic 116.

The logic 116 provides the signal on a line 128 to a switch 132 the operation of which shall be discussed in detail hereinafter. The signal $r_{hstc}$ is indicative of the amount of yaw required for a coordinated turn at a particular aircraft bank angle and airspeed.

The lateral acceleration signal on the line 89 is input to a magnitude limiter 140, which provides a signal to a gain 142 that is controlled as a function of the airspeed signal. As airspeed increases from 60 knots to 80 knots, the magnitude of the gain 142 also increases from zero to a non-zero value, resulting in a larger product on a line 144. Similarly, as the airspeed decreases the magnitude of the gain decreases, resulting in a smaller product being output on the line 144. When airspeed is less than 60 knots, the gain of gain function 142 is zero, providing a signal equal to zero on line 144. The product signal on the line 144 is input to a two pole switch 145 whose operation is controlled by a discrete signal on a line 146 produced by an OR gate 147. The OR gate is responsive to two discrete signals: pilot yaw input engaged YAWENG, and a high speed turn coordination engaged signal, TCENGHS.

Figure 7:
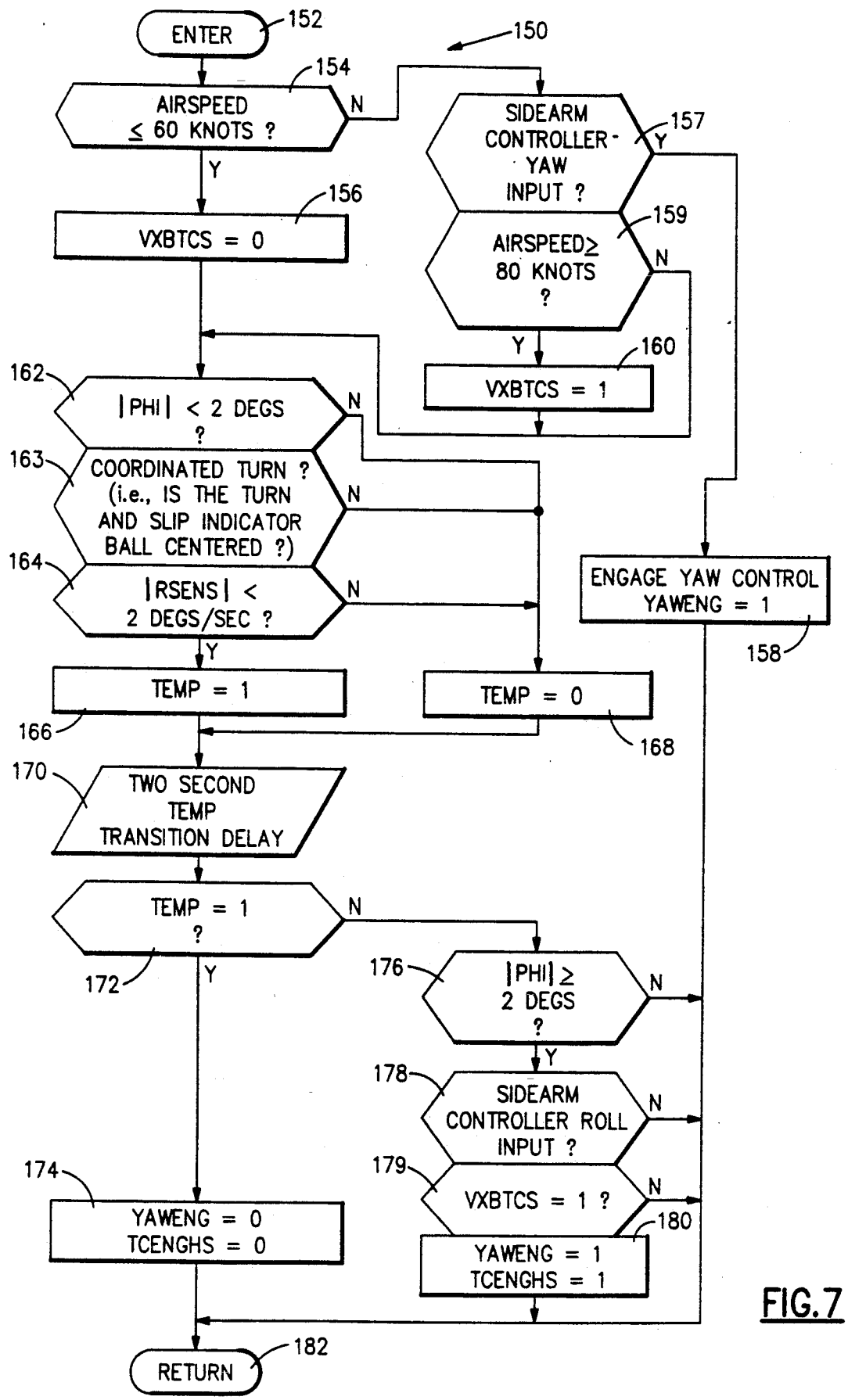
FIG. 7 is a flow chart diagram illustrating execution of the functions disclosed in FIGS. 5, 6, in the embodiment of FIG. 3.

FIG. 7 is a flow chart diagram of a routine 150 for controlling TCENGHS, and YAWENG. The routine is entered at step 152, where a first test 154 determines if the airspeed is less then or equal to 60 knots. If it is, the signal VXBTCS is cleared by a step 156. Otherwise, a test 157 determines if a manual yaw input is being provided from the sidearm controller, and if it is a step 158 engages manual yaw control by setting the discrete YAWENG. If the pilot is not providing a yaw input via the sidearm controller, a test 159 determines if the airspeed is greater than or equal to 80 knots, and if it is the signal VXBTCS is set in a step 160. These steps and tests 154,159 implement a hysteresis function which sets VXBTCS when airspeed is above 80 knots, and clears VXBTCS when airspeed goes below 60 knots, assuming no yaw input is received. Although specific values are often times recited in the specification, they are used by way of example to facilitate an understanding of the invention, and not by way of limitation on the invention. As may be understood by those skilled in the art, the actual values will depend on the requirements of each aircraft.

A test 162 is performed next to determine if the magnitude of the bank angle, PHI is less than 2 degs. If it is, a test 163 is performed to determine if the aircraft is in a coordinated turn (i.e., is the pilot's turn and slip indicator ball centered?). If test 163 determines the aircraft is in a coordinated turn a test 164 is performed to determine if the magnitude of the yaw rate RSENS is less than 2 degs/sec, and if it is a step 166 sets the variable TEMP. If either of tests 162-164 are false a step 168 clears TEMP.

A subroutine 170 is performed next to delay any transitions of the variable TEMP for two seconds. It should be understood that the two second delay has been placed in the logic 150 in the interest of clarity, but clearly in a real time control system such as a flight control system of the present invention, delaying processor functions for two seconds is unacceptable. Therefore, during the two second delay of the subroutine, the microprocessor 96 (FIG. 3) is performing other tasks until the two seconds has elapsed, as well known to those skilled in the art.

A test 172 is performed next to determine if TEMP is set, and if it is both automatic turn coordination and manual yaw control are disengaged (i.e., both TCENGHS and YAWENG are cleared) in a step 174. Otherwise, a test 176 determines if the magnitude of the bank angle, PHI is greater than or equal to two degrees, and if it is a test 178 is performed next. The test 178 examines if the pilot is inputting a roll signal via the sidearm controller by checking the signal on the line 58 (FIG. 2), and if he is inputting a roll signal, a test 179 is performed next to determine if VXBTCS is set and if so turn coordination is engaged by a step 180. A return step 182 is the final step in the routine 150.

It should be noted in the logic illustrated in FIG. 7, that airspeed is only used as a criteria to engage the HSTC logic, it is not used as a criteria for disengaging the HSTC logic. The two criteria for disengaging the HSTC logic are bank angle PHI, and yaw rate RSENS. The test 163 is primarily used for the yaw manual control where yaw input is being received from the sidearm controller. If the magnitude of both PHI and RSENS falls below their respective predetermined minimum, and the aircraft is coordinated, both the HSTC and manual yaw control are disengaged. This allows the HSTC logic to remain engaged throughout a decelerating turn in which the airspeed drops below 60 knots, but either yaw rate or bank angle remains above its respective predetermined minimum threshold defined in tests 162,164.

Referring back to FIG. 5 with the knowledge of how the HSTC logic is engaged/disengaged, the signal on the line 144 is input to the switch 145. When the HSTC logic or manual yaw control are engaged (i.e., TCENGHS=1 or YAWENG=1) the switch 145 closes, allowing the signal on the line 144 to pass onto a line 190 which goes to both a lag filter 192, and a summing function 194. Note, the switch 145 is illustrated in the open position. Making the switch responsive to both TCENGHS and YAWENG, engages the lateral acceleration path (89,144,190) when either the high speed turn coordination conditions are met, or the pilot is providing a manual input via the sidearm controller.

The roll rate signal on the line 88 is input to a lag filter 198 which attenuates high frequency noise, and provides a signal on line 200 to a first limiting function 202, and to a second limiting function 204. The limits of the first and second limiting functions 202, 204, respectively, are designed to provide a signal on a line 206 when the aircraft is rolled in one direction (e.g., 0° to 179°), and similarly to provide a signal on a line 208 when the aircraft is rolled in the other direction (e.g., 0° to −179°). Two gain functions 210,212 are also provided. The magnitude of the first gain 210 is less than the magnitude of the second gain 212, to account for the asymmetrical forces associated with rolling the aircraft to the left, rather than the right, which arise as a result of the main rotor gyroscopic forces and other aircraft asymmetries. The outputs from the first and second gain 210,212 are both input to a summing function 214 which provides a turn anticipation signal on a line 216 to a gain 218.

The gain 218, which is a function of the airspeed signal on the line 63 (similar to the gain 142), provides a signal to a limiting function 220 which in turn provides a signal on a line 222 to a switch 224. The state of the switch 224 is controlled by the signal TCENGHS, such that when TCENGHS is true (i.e., set) the switch is closed placing the signal on the line 222 onto a line 226. Note, the switch is shown in the open position, and the switch is only responsive to the high speed turn coordination discrete TCENGHS, and not the manual yaw control discrete YAWENG. A summing function 227 sums the signal on the line 226 with the output signal from the lag filter 192, and provides a signal on a line 228 to a division function 230. The division function 230 divides the signal on the line 228 by the signal on the line 126, and provides the resultant signal on a line 232 to a summing function 234. The signal on the line 126 is also input to yet another division function 236, where the signal from the summing function 194 is divided by the signal on the line 126, and the result is provided on a line 238 to a summing function 240.

The summing function 240 also receives a signal on a line 242 from a summing function 244, which is responsive to a signal from a switch 132, and a signal on a line 248 from the LSTC 114 (FIG. 4). The switch 132 is controlled by the HSTC enable signal, TCENGHS, such that when the TCENGHS is true (i.e., set) the switch is placed in the closed position. Similarly, when TCENGHS is false (i.e., cleared) the switch is placed into the open position as shown. The summing function 234 provides a signal on a line 250, and the summing function 240 provides a signal on a line 252.

Figure 6:
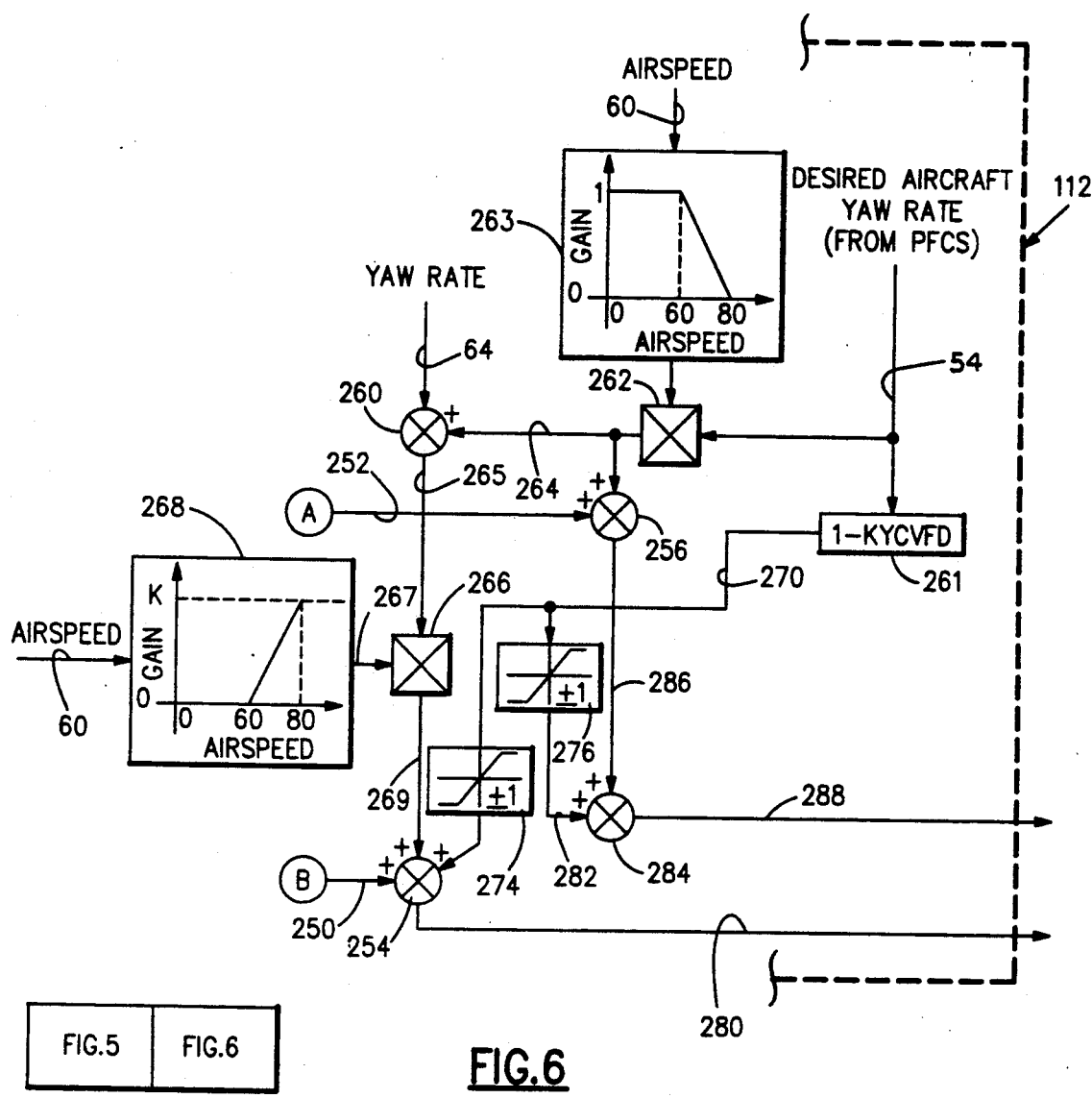
FIG. 6 is a companion schematic illustration of FIG. 5.

Referring to FIG. 6, the remainder of the HSTC logic 112 receives the signals on the lines 250,252 which are provided to summing functions 254,256 respectively. The logic also receives the aircraft yaw rate signal on the line 70 which is input to a summing function 260. The yaw rate command signal on the line 62 from the PFCS is input to both a gain function 261, and to a multiplier 262 which receives an airspeed dependant gain from a scheduler function 263. The multiplier function 262 provides a signal on a line 264 to the summing functions 256 and 260. The summing function 260 provides a signal on a line 265 to a multiplier 266 which also receives an airspeed gain signal on a line 267 from a scheduler 268. The scheduler 268 provides a gain of zero belows 60 knots, and ramps the gain from 60-80 knots. The multiplier 266 provides a signal on a line 269 to the summing function 254. Note the inverse symmetry of gain versus airspeed in the schedulers 263,268.

The gain function 261 provides a signal on a line 270 to limit functions 274,276. Limit function 274 provides a signal to the summing function 254, which in turn provides an output signal on a line 280. The limit function 276 provides a signal to a summing function 284, which also receives a signal on a line 286, and provides the sum of these two signals on a line 288.

FIG. 4–7 presents a detailed illustration of the control laws for the HSTC logic and the manual yaw control logic. Nevertheless, the present invention lies in the HSTC computing a yaw signal necessary to provide a coordinated turn at a particular aircraft bank angle and airspeed, and shaping/conditioning this desired yaw signal as a further function of airspeed, lateral acceleration, and roll rate to provide signals which operate in the aircraft yaw control logic to provide for an improved high speed automatic turn coordination control system. By providing two different yaw rate command signals on the lines 280,288, the HSTC achieves improved automatic turn coordination, in part due to the additional shaping/conditioning associated with having two separate lateral acceleration paths, one with a lag filter 192, and the other without.

The manual yaw control is also provided for in the HSTC logic. As illustrated in FIG. 7 and discussed hereinbefore, when a sidearm controller yaw input is received (157), the manual yaw control is engaged by setting YAWENG. Now referring to FIG. 5, when YAWENG is set, switch 145 is closed which engages the lateral acceleration path (89,144,190), from which a synthesized yaw rate signal is computed and compared to the actual aircraft yaw rate signal as shown in FIG. 6, and hereinbefore discussed. Comparing the desired aircraft yaw rate with the synthesized yaw rate computed from lateral acceleration allows the pilot to control lateral acceleration via the sidearm controller.

When the sidearm controller provides only a yaw input, a flat turn is being commanded (i.e., bank angle equals zero). This is a desirable response at high speeds for yaw inputs.

LOW SPEED TURN COORDINATION LOGIC

Figure 8:
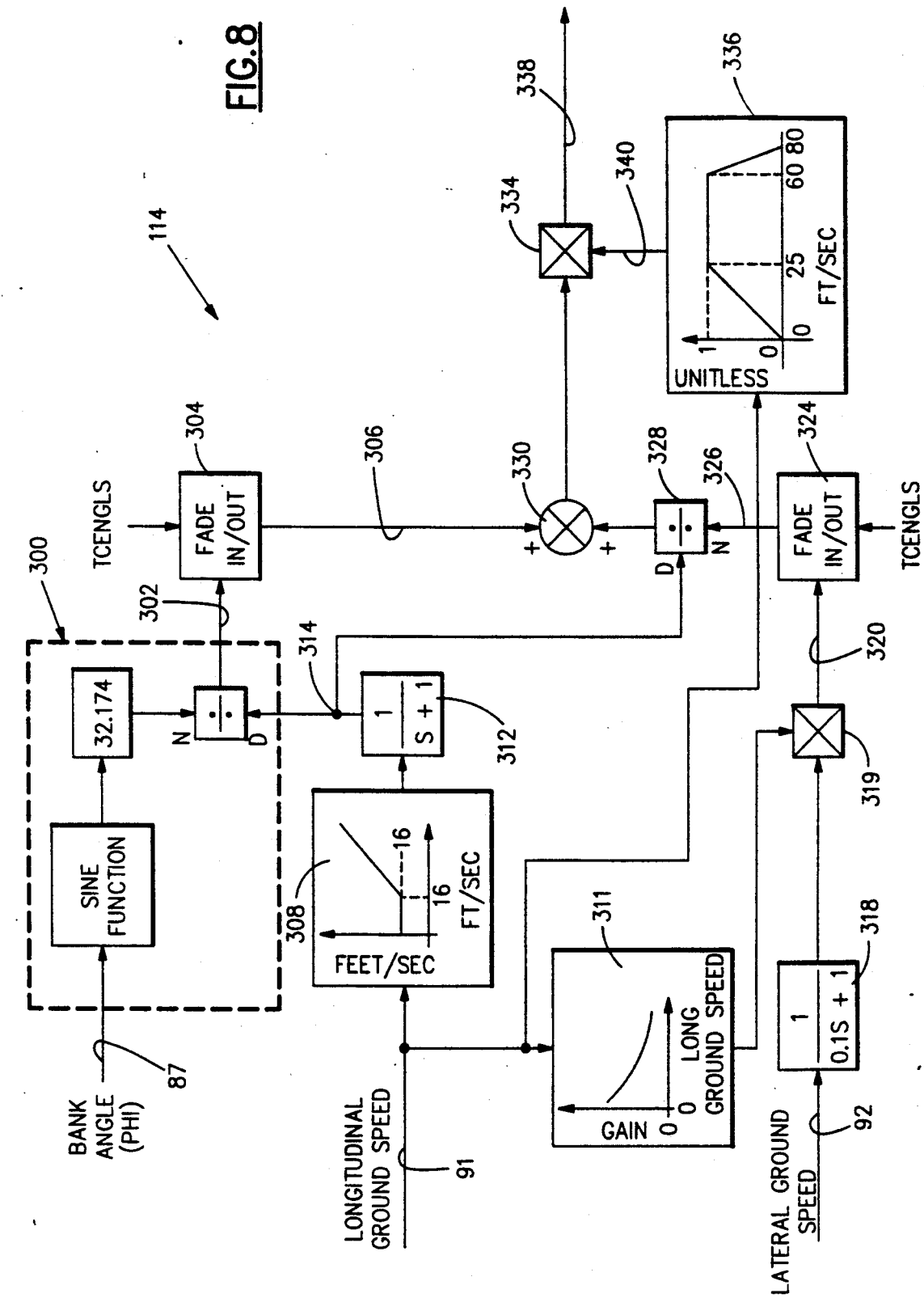
FIG. 8 is a schematic illustration depicting still further functional details of FIG. 4.

The LSTC logic 114 illustrated in FIG. 8, receives the bank angle signal, PHI, the longitudinal ground speed signal and the lateral ground speed signal. The bank angle signal on the line 87 is input to computation logic 300 which implements the equation:

$$r_{lstc} = (g * \sin(PHI))/(\text{conditioned ground speed}) \qquad (Eq. 2)$$

where:

$r_{lstc}$ = yaw rate necessary for a coordinated turn
g = 32.174 feet/sec$^2$
PHI = the bank angle signal on the line 87. The variable $r_{lstc}$ is indicative of the amount of aircraft yaw required for a particular bank angle PHI, and conditioned ground speed for the aircraft to be in a coordinated turn. The computation logic 300 implements Eq. 2 and provides a signal on a line 302 to a fade function 304 whose operation is controlled by the discrete signal TCENGLS. That is, when TCENGLS is set the fade function gain transitions to unity and passes the signal on the line 302 onto a line 306. That is, the function fades the input signal in or out on the fade output line within a specified period of time depending on the state TCENGLS. When TCENGLS transitions when clear to set, the fade function fades in the input signal, and when TCENGLS transitions from set to clear the function fades the signal out.

The longitudinal ground speed signal on the line 91 is input to a limiting function 308 which ensures its limited output signal on a line 310 does not drop below a certain value (e.g., 16 knots) to prevent dividing by zero. The longitudinal groundspeed signal is also input to a gain scheduler 311. The limited output signal is input to a lag filter 312 which provides the conditioned ground speed signal on a line 314 to the logic 300.

The lateral ground speed signal is input on a line 92 to a lag filter 318 which attenuates high frequency noise, and provides a filtered signal to a multiplication function 319. The multiplication function multiplies the signals from the gain scheduler 311 and the filter 318 to provide a conditioned longitudinal ground speed signal on a line 320. A fade function 324 under the control of the discrete signal TCENGLS, receives the conditioned ground speed signal, and in turn provides an output signal on a line 326 to a division function 328. Similar in operation to the fade function 304, the fade 324 fades in the conditioned ground speed signal when TCENGLS is set, and fades speed signal out when TCENGLS is cleared. The division function 328 provides an output signal to a summing function 330, which also receives the signal on the line 306. The summed value is input to a multiplication function 334.

A scheduler 336 allows the multiplication function 334 to pass a non-zero signal onto an output line 338, while the longitudinal ground speed signal on the line 91 is between 0 and 80 knots. As shown, the scheduler 336 provides for the non-zero signal by ramping in/out the multiplicand signal on a line 340 between zero and one. Therefore, it is evident from the scheduler that the LSTC logic in this one embodiment is operational only between 0 and 80 knots; providing full authority from 25 to 60 knots, and limited authority between 0 to 25 knots, and 60 to 80 knots.

Figure 9:
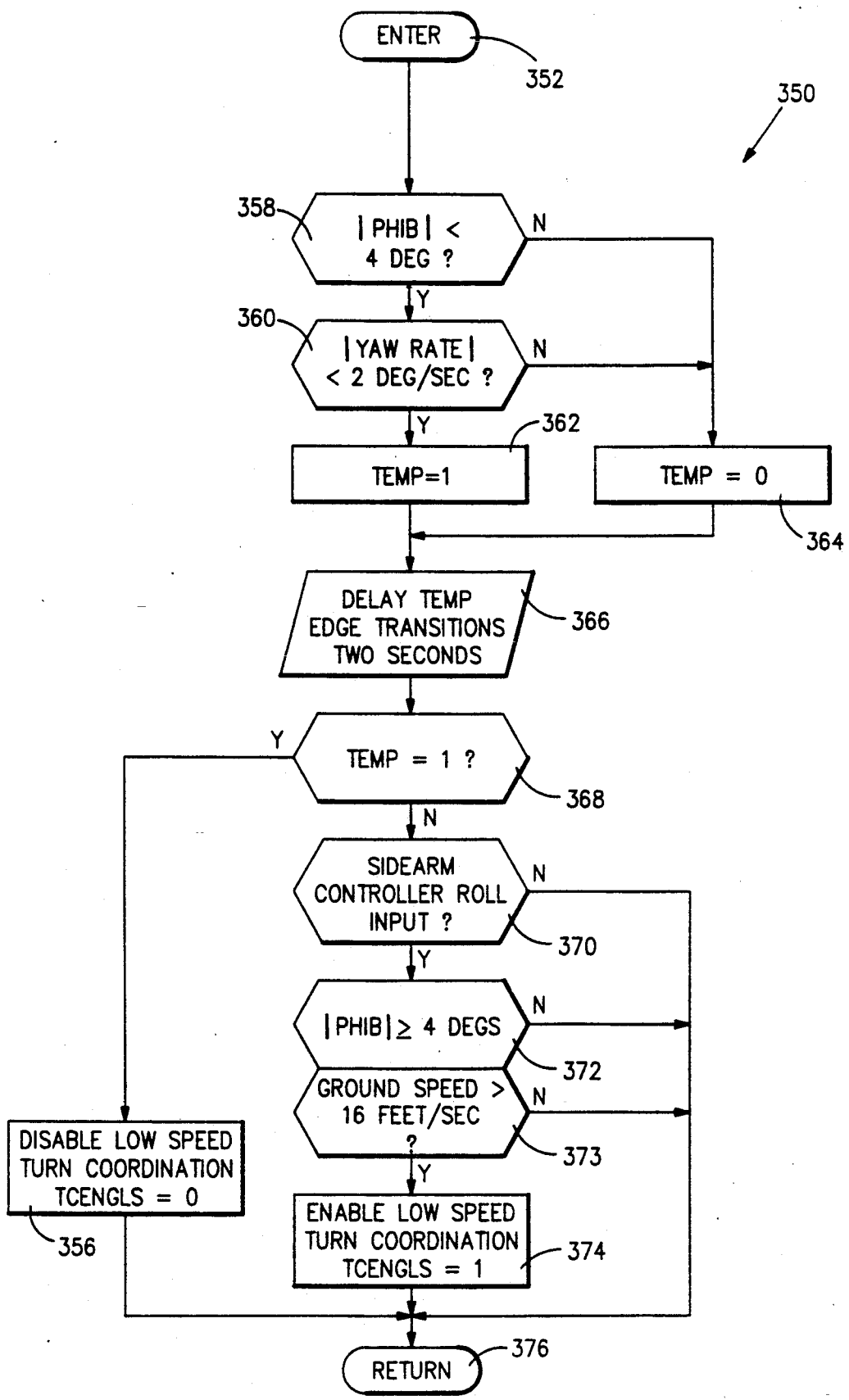
FIG. 9 is a flow chart diagram illustrating execution of the functions disclosed in FIGS. 8, in the embodiment of FIG. 3.

FIG. 9 illustrates a routine 350 which enables/disables the LSTC logic by controlling the discrete signal TCENGLS. Upon entering the routine via a step 352, a test 358,360 determine if the magnitude of the bank angle, PHI is less than 4 degrees, and, the magnitude of the aircraft yaw rate is less than 2 degrees/second. If both both conditions are true, a variable TEMP is set by a step 362. However, if either of tests 358 or 360 are negative, a step 364 clears TEMP. A subroutine 366 is performed next to delay the edge transitions of the variable TEMP similar in operation of subroutine 170 (FIG. 7).

A test 368 which judges the state of TEMP is performed next. If TEMP is set then step 356 is performed which clears TCENGLS, otherwise, a test 370 is executed to determine if the pilot is providing a roll input via the sidearm controller. If he is, and the magnitude of the bank angle PHI is greater than or equal to 4 degrees as determined by a test 372 and the longitudinal ground speed is greater than 16 feet/sec in test 373, a step 374 is performed to enable the LSTC logic by setting TCENGLS. Then, the routine 350 is exited via a return step 376. Using ground speed only to engage the LSTC logic, allows the logic to remain engaged throughout a decelerating turn as long as the magnitude of both yaw rate and bank angle remain above their respective predetermined thresholds defined in test 358,360.

TRIM CONTROL FOR AUTOMATIC TURN COORDINATION

Figure 10:
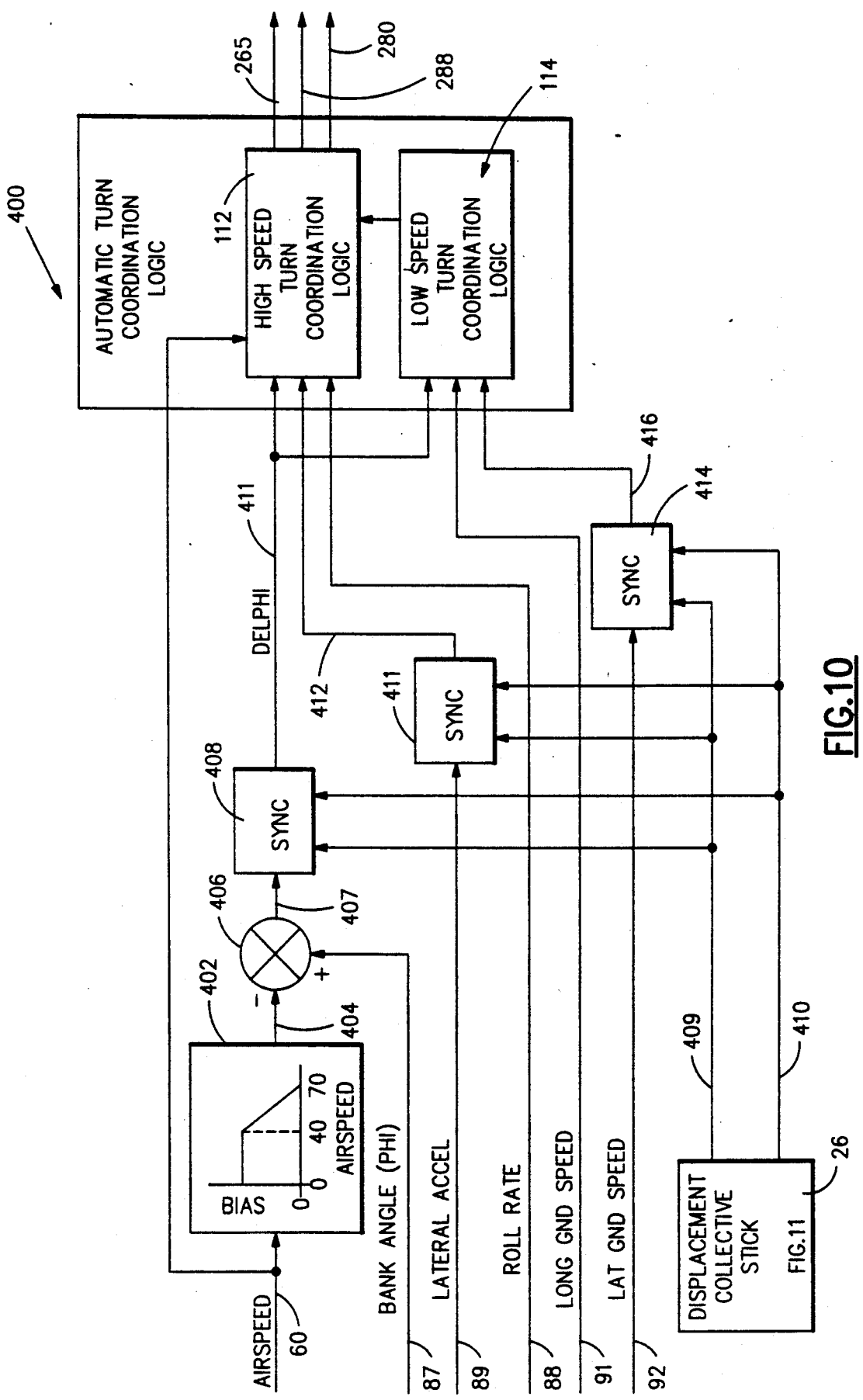
FIG. 10 is a schematic illustration of a trim control system which operates in conjunction with the logic of FIGS. 5-9.

FIG. 10 is a functional illustration of a Lateral/Directional Trim Control Function 400 which operates in conjunction with the aforementioned high and low speed automatic turn coordination systems to provide turn coordination about a stored trim (i.e., an aircraft roll attitude). As an example, during crosswind conditions the aircraft can be trimmed to a non-zero bank angle in order to compensate for the wind, and the turn coordination function will automatically coordinate the turn about this new trim attitude. This provides the pilot with automatic turn coordination about an adjustable trim attitude he has selected, thereby eliminating the need for the pilot to apply manual crosswind compensation.

Referring to FIG. 10, the airspeed signal on the line 63 is provided to a function 402 which provides a signal on a line 404 to a summing function 406. The summing function also receives the bank angle signal on the line 87, and provides a difference signal to a synchronizer 408. Operation of the synchronizer 408 is controlled by two discrete signals NTCRELI and TCON on lines 409,410 respectively from the displacement collective stick 26.

The synchronizer 408 provides a signal DELPHI on a line 411 to the HSTC logic 112 and the LSTC logic 114. The signal DELPHI represents the difference between the signal on the line 407 and the stored bank angle value within the synchronizer 408. The stored bank angle within the synchronizer 408 represents the new bank angle datum about which the HSTC and LSTC will control.

The lateral acceleration signal on the line 89 is input to a synchronizer 411 which provides a signal on a line 412 to the HSTC logic 112. The lateral ground speed signal on the line 92 is input to a synchronizer 414 which provides a synchronized signal on line 416. Operation of each of the synchronizers 410,411 and 414 is controlled by discrete signals NTCREL1 and TCON.

Figure 11:
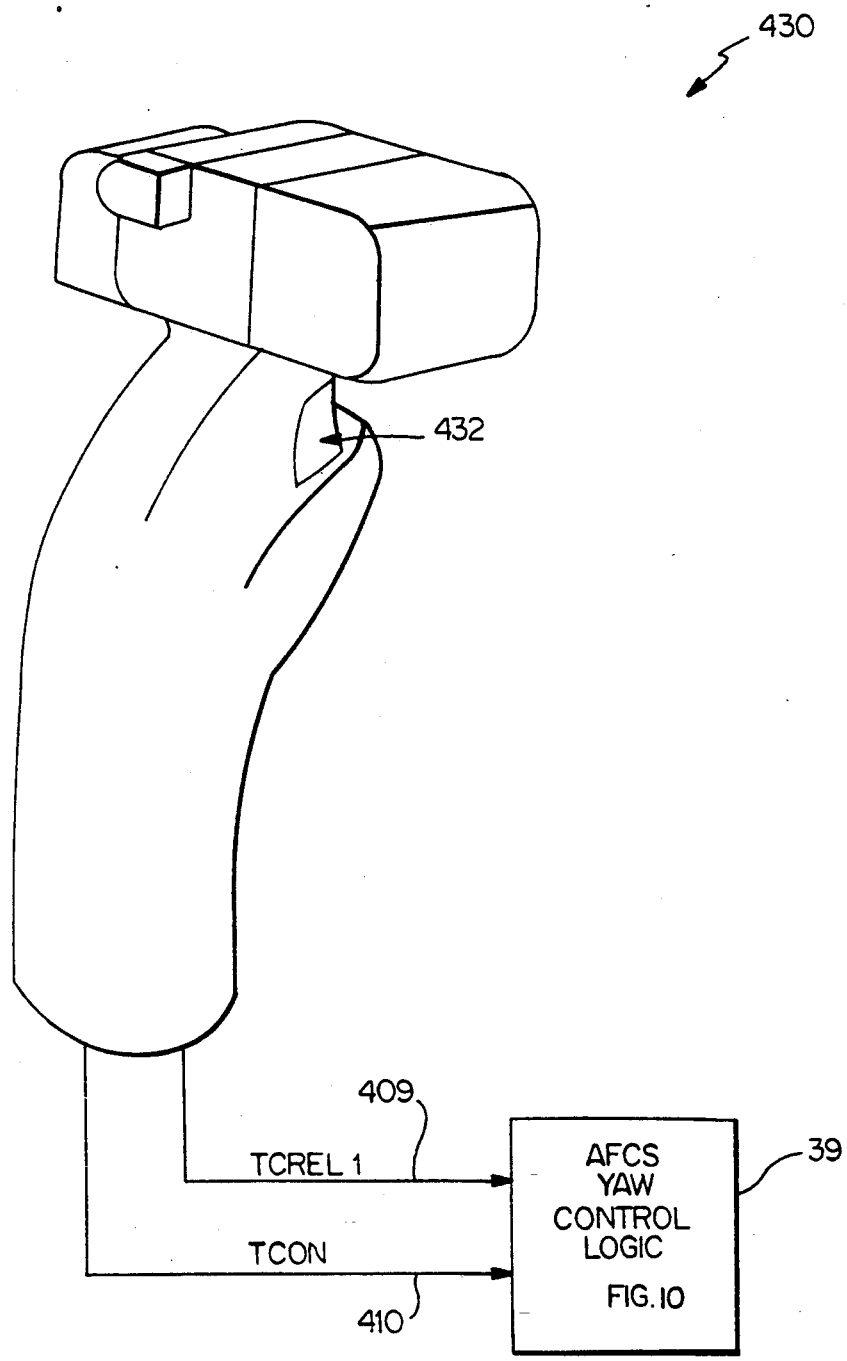
FIG. 11 is a figurative illustration, partially in perspective and partially in schematic, depicting details of another component used in the embodiment of FIG. 1.

FIG. 11 illustrates a grip portion 430 of the displacement collective stick 26, with the grip portion having a three position trim switch 432. The state of the three position switch is defined by the two discrete signals, TCREL1 and TCON which are provided from the grip on the lines 409,410 respectively. The state of these signals is based upon the position of the switch as defined in Table 1.

TABLE 1

| SWITCH POSITION | TCREL1 | TCON |
|---|---|---|
| first | 0 | 0 |
| second | 1 | 0 |
| third | 0 | 1 |

When the switch is in the second position, the pilot is commanding that both the HSTC logic and LSTC logic be disengaged so he can fly the aircraft in an uncoordinated manner if he so desires without interference from the HSTC and LSTC logics. When the switch position is released from the second position to transition back to the first position, the synchronizers 408, 411 and 414 (FIG. 10) respond by storing the respective input each is currently receiving. This captures the desired trim attitude of the aircraft. That is, if the pilot desires to trim the aircraft about a new attitude, the pilot places the switch 432 into the second position disabling the HSTC and LSTC logic, and flies the aircraft to the desired attitude about which he wishes to capture his new trim point. Once he reaches the desired attitude, he releases the switch from its second position allowing the switch to transition to its first position, which triggers the synchronizers to store the input signal each is currently receiving.

As an additional feature in this system, the third switch position is used to initiate a command that the trim attitude currently stored in the synchronizers be faded out over a several second period (e.g., three seconds) to the nominal wings level attitude. When the several seconds has elapsed, the synchronizers will each have as their respective stored trim value the nominal trim which is indicative of a wings level attitude. It is contemplated as an alternative embodiment, that the function of the trim switch 432 may be performed by using two switches, and/or the switch may also be located in a position other than on the collective 430. As an example the switch may be a foot operated switch, or it may be placed on the sidearm controller.

Figure 12:
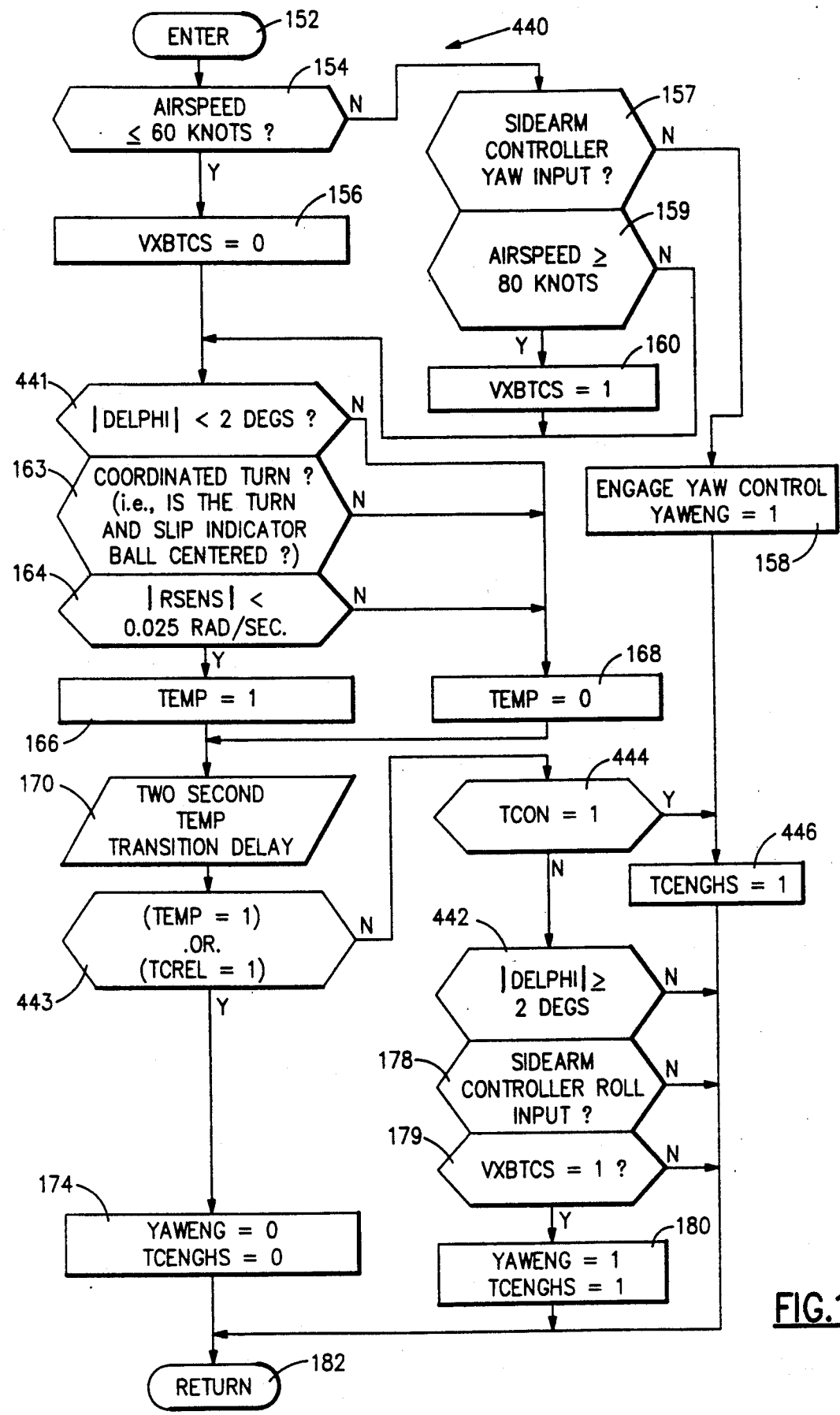
FIG. 12 is an alternative flow chart diagram to that illustrated in FIG. 7 to accommodate incorporation of the trim control of FIG. 10 into the flight control function illustrated in FIGS. 5, 6.
Figure 13:
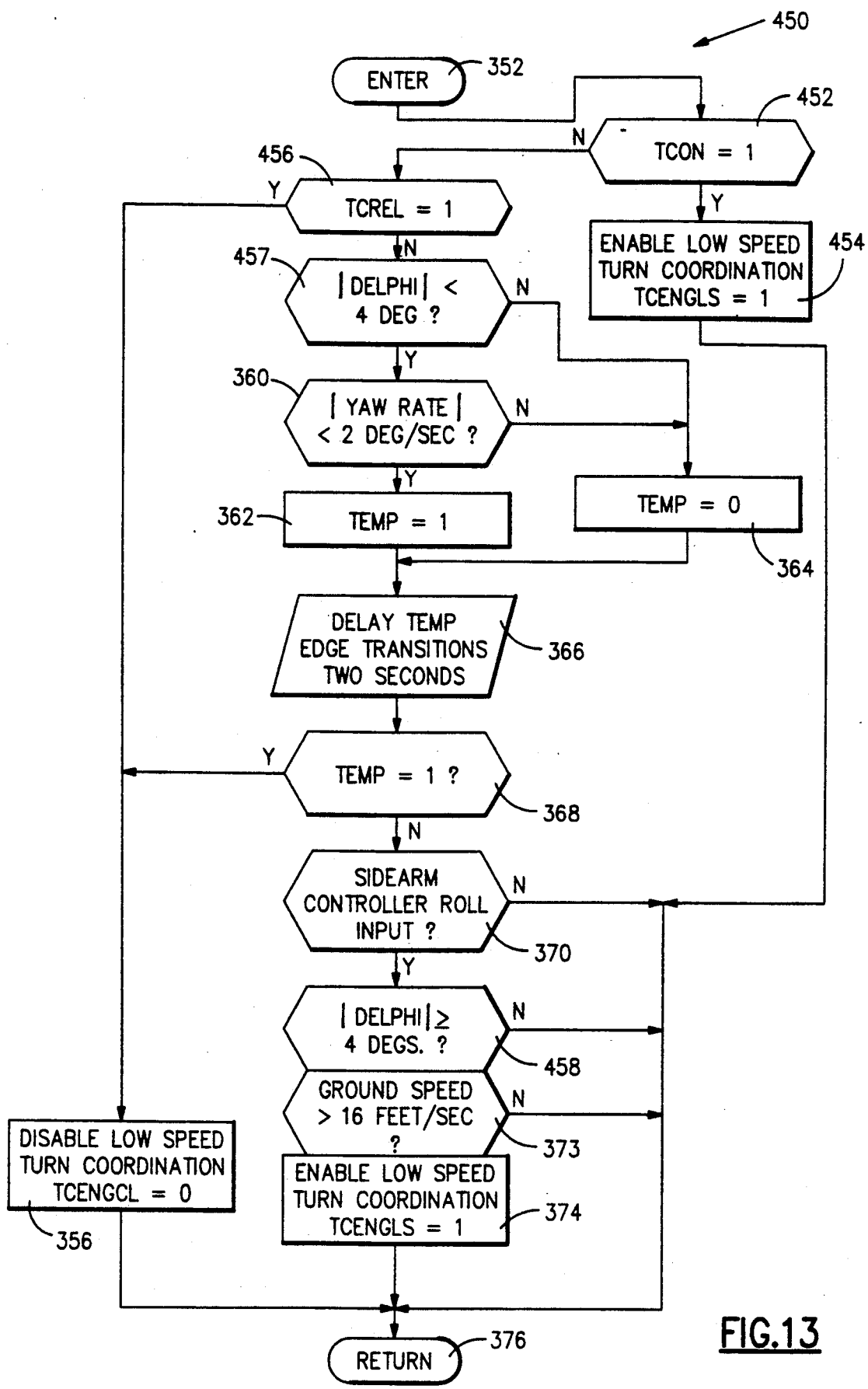
FIG. 13 is an alternative flow chart diagram to that illustrated in FIG. 9, for controlling the switches within the LSTC logic of FIG. 8 when the trim function of FIG. 10 is incorporated.

The state of the discrete NTCREL1 and TCON are also used to control the HSTC logic and the LSTC logic in a manner illustrated in FIG. 12 and 13. FIG. 12 illustrates a routine 440 which is a modified version of the routine in FIG. 7, for controlling whether the HSTC logic 112 is engaged or not (i.e., whether the discrete TCENGHS is set or cleared). In the interest of brevity, without sacrificing detail, only the differences between FIGS. 7 and 12 will be discussed. The steps, tests and subroutines which have not been modified shall retain the same numerical designation as used in FIG. 7.

Referring to FIG. 12, the routine 440 has been modified first by changing the judgments in tests 441 and 442 to DELPHI which is the signal on the line 411 (FIG. 10). By using DELPHI, rather than PHI, the bank angle datum is now the value stored in the synchronizer 408, rather than the nominal datum of wings level attitude. Another modification is the addition of a judgment of the signal TCREL1 to a test 443. If either of the two conditions in test 443 are satisfied, the step 174 disengages the HSTC. Otherwise, if neither the conditions are satisfied, a test 444 is performed. Test 444 determines if the switch is the third position by judging if the discrete TCON is set, and if it is the HSTC logic is engaged by setting TCENGHS in a step 446. All the steps/tests/subroutines which have not been modified, operate in the same manner as disclosed in FIG. 7.

The LSTC logic is also modified to work in conjunction with the trim logic by modifying the routine 350 in FIG. 9 to produce routine 450 illustrated in FIG. 13. Referring to FIG. 13, one modification is the addition of a test 452 which determines whether the switch 432 is in the third position. If it is, as indicated by TCON being set, the LSTC logic is engaged by setting TCENGLS in a step 454 and then exiting the routine 450 via a step 376. Otherwise, the routine continues to execute by performing a test 456. The test 456 judges whether the aircraft ground speed is less than 16 feet/second or TCREL1 is set, and if either of these two conditions is satisfied, the LSTC logic is disengaged by clearing TCENGLS in step 356. If neither of the conditions in the test 456 are satisfied, a test 457 is executed next. The test 457 determines if the magnitude of DELPHI is less than 2 degs, similar to test 441 (FIG. 12). DELPHI is also judged in a test 458, rather than PHI. Now that the operation of the HSTC and LSTC logic, along with the trim control logic, have been disclosed, the discussion can return to the AFCS yaw control logic illustrated in FIG. 4.

Referring back to FIG. 4, the HSTC logic 112 provides the signal on the line 288 to a Body to Euler Transformation 459 which transforms the signal which is in terms of aircraft body axes, to a signal on a line 460 which is in terms of inertial axes. The Transform 459 also receives signals indicative of aircraft bank angle, pitch attitude, and commanded pitch rate on line 87, 86 and 461 respectively. The details of how the transform is performed are illustrated in FIG. 14. One of ordinary skill in the art will appreciate that an explanation is not required since the operation of the transform is readily apparent from FIG. 14.

The signal on the line 460 indicative of the desired yaw rate of change is input to an aircraft attitude model, which in the exemplary embodiment is an integrator 462 which integrates the desired yaw rate signal on the line 460 over time, providing a signal indicative of desired aircraft heading on a line 464 to a summing function 466. The summing function also receives the actual aircraft heading signal on the line 90, and provides a heading error signal on a line 468 to a Euler to Body Transform 470.

The transform 470 converts the signal on the line 468 which is with respect to inertial axes, back to aircraft body axes. The Transform 470 also receives signals indicative of aircraft bank angle, pitch attitude, and pitch attitude error on lines 87, 86 and 471 respectively. The details of the Euler to Body Transform 470 are illustrated in FIG. 15, which upon observation shows an explanation is unnecessary since the operation of the transform as illustrated in FIG. 15 is apparent to one skilled in the art.

The Transform 470 provides a transformed heading error signal on a line 472 to a proportional and integral compensator 474. The compensator provides a signal on a line 476 to a summer 478 which also receives the signal on the line 280 feedforward from the HSTC logic 112 after being multiplied by a yaw rate gain 479, and provides the signal on the line 84. The value of the yaw rate gain 479 is equal to the rate gain stage 64 (FIG. 1) in the PFCS yaw control module 35. Using the same value for these gains allows the product of the commanded yaw rate signal and the yaw rate gain on the line 480, to cancel the yaw feedback signal in the PFCS yaw logic module 35 (FIG. 1). The cancelation further improves the automatic turn coordination system performance.

Figure 16:
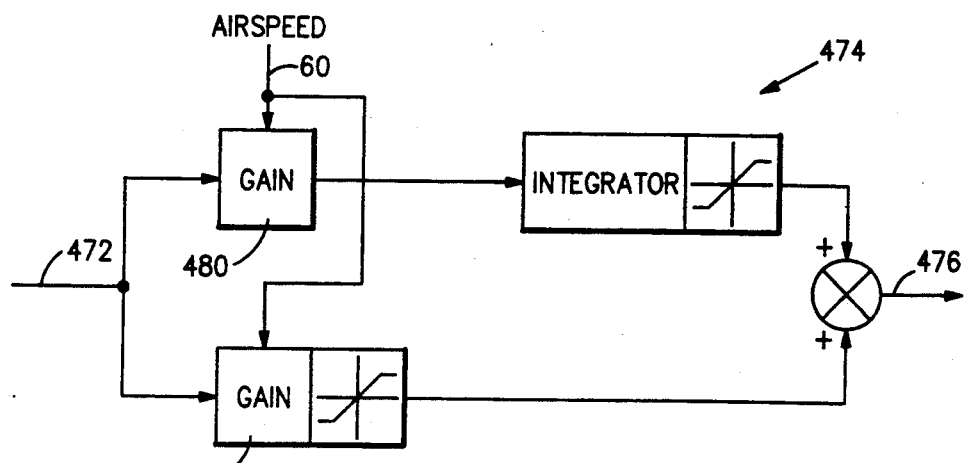
FIG. 16 is an illustration of the proportional and integral compensator of FIG. 4.

The details of the compensator 474 are illustrated in FIG. 16. The operation of the compensator is apparent from the figure making a detailed explanation unnecessary. However, attention is drawn to the fact that gains 481,482 in the integral and proportional paths respectively, are a function of the airspeed signal on the line 60.

It should be understood the scope of this invention is not limited by the specific gains, lag filters, summing functions and limiting functions presented herein. Rather, it is contemplated in the practice of the present invention that the specific control laws are going to change based upon the dynamics of the plant to be controlled (e.g., an attack helicopter versus a commercial helicopter), and the peculiarities associated with each plant. As an example, the PFCS rate model may be required in some applications to be an order greater than the first order lag disclosed hereinbefore. Similarly, the inverse model may be greater than first order. In addition it is not necessary that the flight control system be partitioned in a PFCS and an AFCS. Rather it is contemplated that the system may not be partitioned at all in some applications, whereas in other applications the system may be further partitioned into subsystems based on criteria such as reliability and maintainability.

Furthermore, while it is obvious it still is worth stating that the present invention is clearly not limited to a microprocessor based control system. The system may be implemented in a non-microprocessor based electronic system (either digital or analog).

All the foregoing changes and variations are irrelevant to the invention, it suffices that a model following rotary wing aircraft flight control system provides automatic turn coordination in response to roll commands, by supplying a yaw command for the aircraft, which is computed based upon the aircraft bank angle and airspeed to predict the desired turn rate necessary for the aircraft to be in a coordinated turn at that airspeed and bank angle, and the yaw command signal is shaped/conditioned based on signals indicative of the aircraft lateral acceleration and roll rate, to provide an improved automatic turn coordination system.

Although the present invention has been shown and described with respect to a best mode embodiment thereof, it should be understood by those skilled in the art that various other changes, omissions and additions to the form and detail of the thereof, may be made therein departing from the spirit and scope of the invention.

We claim:

1. A helicopter flight control system which receives an heading signal indicative of the helicopter heading, and a yaw rate signal indicative of the helicopter's rate of change about the yaw axis, comprising:
   a multi-axis sidearm controller for providing a yaw axis command signal;
   rate model means responsive to said yaw axis command signal, for providing a rate set point signal indicative of the desired rate of change about the yaw axis of the helicopter;
   means for computing the difference between said rate set point and the yaw rate signal, and for providing a yaw rate error signal indicative thereof;
   inverse model means responsive to said rate set point signal for scheduling a feedforward command signal to drive the helicopter to respond about its yaw axis in a manner which is essentially equal to said set point signal;
   means responsive to said set point signal, comprising:
      means for coordinating helicopter banked turns at airspeeds above 60 knots by conditioning said point signal as a function of the helicopters bank angle, airspeed, lateral acceleration, roll rate and yaw rate, to provide a conditioned set point which is indicative of the yaw rate at which the aircraft turn will be coordinated;
      means for integrating said conditioned set point to provide an aircraft heading set point signal, for comparing said heading set point and the heading signal, and for providing a heading error signal indicative of the difference; and
   conditioning means responsive to said rate error signal, said feedforward command signal, and said heading error signal, for providing a command signal to the helicopter tail rotor which results in the necessary tail rotor pitch to place the aircraft in a substantially coordinated turn at airspeeds above 60 knots.

2. A high speed turn coordination system for a helicopter of the type having: a plurality of sensors which provide sensed signals indicative of helicopter lateral acceleration, bank angle, yaw rate, roll rate, heading, and airspeed; a sidearm controller supplies a yaw axis command signal to the turn coordination system which provides a coordinating yaw command signal to the tail rotor during a banked turn to place the helicopter in a coordinated turn, the turn coordination system comprising:
   means for providing, for each value of the yaw axis command signal presented thereto, a corresponding desired yaw rate set point signal value indicative of the desired helicopter rate of change about the helicopter yaw axis;
   turn coordination means, for biasing each value of said desired yaw rate set point signal presented thereto with a yaw rate bias signal value to provide a conditioned yaw rate set point signal value, for computing said yaw rate bias signal value as a function of the sensed signal values indicative of bank angle, airspeed, lateral acceleration and roll rate, where said yaw rate bias signal value is indicative of the yaw rate required for the helicopter to be in coordinated flight during a banked turn;
   means for transforming each value of said conditioned yaw rate set point signal from its basis with respect to helicopter body axes to a new basis with respect to Euler inertial axes, and for providing a transformed signal indicative thereof;
   means for integrating said transformed signal value to provide a desired helicopter heading set point signal value;
   first means for computing a difference signal value between said desired helicopter set point signal value and the sensed heading signal value, and for providing a heading error signal indicative of the difference value;
   means for re-transforming each value of said heading error signal from its basis with respect to Euler inertial axes back to the basis with respect to the helicopter body axes, and for providing a transformed heading error signal value indicative thereof;

means for computing a second difference value between said desired yaw rate set point signal value and the sensed yaw rate signal value, and for providing a yaw rate error signal indicative of the second difference value;

inverse model means for providing for each value of said desired yaw rate set point signal a feedforward yaw set point signal value indicative of the amount of yaw required for the helicopter to rotate about its yaw axis at a rate set by said desired yaw rate set point signal value;

means for summing said transformed heading error signal value, said yaw rate error signal value and said feedforward yaw set point signal value, to provide as a summation thereof the coordinating yaw command signal value; and means for outputting the coordinating yaw command signal value to the helicopter tail rotor.

3. The system of claim 2, wherein said turn coordination means comprises:

means, for calculating the sine of the sensed bank angle signal, and for providing a signal indicative thereof; and means for multiplying said sine of the bank angle signal by a constant value indicative of acceleration due to gravity, and for dividing the product thereof by the sensed airspeed signal value to provide a coordinating yaw rate signal; and means, responsive to the sensed signals indicative of: lateral acceleration, roll rate, and airspeed, for conditioning each value of said coordinating yaw rate signal as a function of the sensed signals to provide said yaw rate bias signal value.

4. The system of claim 3, wherein said turn coordination means comprises means for setting said yaw rate bias signal value equal to zero at airspeeds less than a first threshold value, such that automatic turn coordination is provided only at airspeeds above said first threshold value.

5. The system of claim 3, wherein said inverse model means includes a lead filter of at least first order.

6. The system of claim 5, wherein said turn coordination means includes means for calculating a heading bias signal value which is computed as a function of the sensed signals indicative of bank angle, airspeed, lateral acceleration, and roll rate; and wherein said means for summing sums said heading bias signal value with said transformed heading error signal value, said yaw rate error signal value, and said feedforward yaw set point signal value to provide the coordinating yaw command signal value.

7. The system of claim 6, wherein said turn coordination means comprises means for setting both said yaw rate bias signal value and said heading bias signal value equal to zero at airspeeds less than a first threshold value, such that automatic turn coordination is provided only at airspeeds above said first threshold value.

8. The system of claim 7, wherein said means for computing includes a rate gain multiplier for multiplying the second difference value by a gain value to provide as the product value thereof said yaw rate error signal value.

9. A helicopter flight control system of the type having a plurality of sensors which provide: rate signals indicative of the helicopter's yaw and roll rates of change, attitude signals indicative of actual bank angle and heading, and a signal indicative of actual airspeed; a sidearm controller supplies a yaw axis input signal to the control system which automatically provides a coordinating yaw command signal to the helicopter's tail rotor to automatically coordinate helicopter flight during banked turns, the control system comprising:

means for providing, for each value of the yaw axis input signal, a corresponding desired yaw rate set point signal value indicative of the desired helicopter rate of change about the helicopter yaw axis;

a feedforward path including inverse model means for providing for each said desired yaw rate set point signal value a feedforward yaw set point signal value indicative of the command to the tail rotor required for the helicopter to rotate about its yaw axis at said desired yaw rate set point signal value;

a rate feedback path including means for computing a difference value between said desired yaw set point signal value and the sensed yaw rate signal value, and for providing a yaw rate error signal value indicative of the difference;

an attitude feedback path comprising:

means responsive to the signal indicative of: bank angle, airspeed, lateral acceleration and roll rate, for computing a yaw rate bias signal value, and for biasing said desired yaw rate set point signal value presented thereto with said yaw rate bias signal value to provide a conditioned yaw rate set point signal;

means for transforming each value of said conditioned yaw rate set point signal from its basis with respect to helicopter body axes to a new basis with respect to Euler inertial axes, and for providing a transformed signal indicative thereof;

means for integrating said transformed signal value to provide a desired helicopter heading set point signal value;

first means for computing a difference value between said desired helicopter heading set point signal value and the sensed heading signal value, and for providing a heading error signal value indicative of the difference value;

means for re-transforming each value of said heading error signal from its basis with respect to Euler inertial axes back to the basis with respect to the helicopter body axes, and for providing a transformed heading error signal value indicative thereof;

means for summing said feedforward yaw rate set point signal value, said yaw rate error signal value, and said transformed heading error signal value to provide the coordinating yaw command signal indicative of the summation value; and means for outputting the coordinating yaw command signal to the tail rotor.

10. The system of claim 9, wherein said turn coordination means comprises:

means, for calculating the sine of the sensed bank angle signal, and for providing a signal indicative thereof; and means for multiplying said sine of the bank angle signal by a constant value indicative of acceleration due to gravity, and for dividing the product thereof by the sensed airspeed signal value to provide a coordinating yaw rate signal; and means, responsive to the sensed signals indicative of: lateral acceleration, roll rate, and airspeed, for conditioning each value of said coordinating yaw rate signal as a function of the sensed signals to provide said yaw rate bias signal value.

11. The system of claim 10, wherein
said turn coordination means includes means for calculating a heading bias signal value which is computed as a function of the sensed signals indicative of bank angle, airspeed, lateral acceleration, and roll rate; and wherein
said means for summing sums said heading bias signal value with said transformed heading error signal value, said yaw rate error signal value, and said feedforward yaw set point signal value to provide the coordinating yaw command signal value.

12. The system of claim 11, wherein said turn coordination means comprises means for setting both said yaw rate bias signal value and said heading bias signal value equal to zero when the sensed airspeed signal value is less than a first threshold value, such that automatic turn coordination is enabled only when the value of the sensed airspeed signal is greater than said first threshold value.

13. The system of claim 12, wherein
said means for computing includes a rate gain multiplier for multiplying the second difference value to provide as the product value thereof said yaw rate error signal value.

14. The system of claim 13, wherein said inverse model means includes a lead filter of at least first order.

15. The system of claim 14, wherein said first threshold value is equal to 60 knots.

* * * * *